United States Patent [19]
Wedl et al.

[11] Patent Number: 6,140,401
[45] Date of Patent: *Oct. 31, 2000

[54] USE OF A STABILIZER COMBINATION IN THE PRODUCTION OF FILMS OF POLYVINYL CHLORIDE BY THE CALENDERING PROCESS

[75] Inventors: Peter Wedl; Ernst-Udo Brand, both of Bremerhaven; Arthur Peters, Loxstedt; Joerg-Dieter Klamann, Bremerhaven, all of Germany

[73] Assignee: Henkel Kommanditgesellschaft auf Aktien, Duesseldorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/776,479

[22] PCT Filed: Jul. 14, 1995

[86] PCT No.: PCT/EP95/02776

§ 371 Date: Feb. 27, 1997

§ 102(e) Date: Feb. 27, 1997

[87] PCT Pub. No.: WO96/03459

PCT Pub. Date: Feb. 8, 1996

[30] Foreign Application Priority Data

Jul. 27, 1994 [DE] Germany .............................. 44 26 571

[51] Int. Cl.[7] ....................................................... C08K 5/04
[52] U.S. Cl. ............................................................ 524/399
[58] Field of Search .................................... 524/396, 399, 524/414, 436, 450

[56] References Cited

U.S. PATENT DOCUMENTS

| | | | |
|---|---|---|---|
| 3,539,306 | 11/1970 | Kumura et al. | 23/315 |
| 3,650,704 | 3/1972 | Kumura et al. | 23/315 |
| 3,875,525 | 4/1975 | Ballinger et al. | 331/1 A |
| 4,116,907 | 9/1978 | Shiohara et al. | 260/23 XA |
| 4,123,399 | 10/1978 | Gay | 260/23 XA |
| 4,338,226 | 7/1982 | Worschech et al. | 524/302 |
| 4,590,233 | 5/1986 | Erwied et al. | 524/357 |
| 4,751,261 | 6/1988 | Miyata | 524/399 |
| 5,010,123 | 4/1991 | Worschech et al. | 524/114 |
| 5,120,783 | 6/1992 | Nosu et al. | 524/357 |
| 5,143,959 | 9/1992 | Carette et al. | 524/267 |
| 5,298,545 | 3/1994 | Razvan et al. | 524/414 |
| 5,352,723 | 10/1994 | Tanno | 524/399 |
| 5,492,949 | 2/1996 | Drewes | 524/399 |
| 5,569,694 | 10/1996 | Kuhm | 524/399 |

FOREIGN PATENT DOCUMENTS

| | | |
|---|---|---|
| 979575 | 12/1975 | Canada . |
| 1036455 | 8/1978 | Canada . |
| 1077189 | 5/1980 | Canada . |
| 0027588 | 4/1981 | European Pat. Off. . |
| 0063180 | 10/1982 | European Pat. Off. . |
| 0432495 | 6/1991 | European Pat. Off. . |
| 0453379 | 10/1991 | European Pat. Off. . |
| 2 574 805 | 6/1986 | France . |
| 1592126 | 10/1970 | Germany . |
| 1907768 | 6/1971 | Germany . |
| 2412837 | 10/1974 | Germany . |
| 2600516 | 7/1976 | Germany . |
| 2728865 | 1/1978 | Germany . |
| 2716389 | 2/1978 | Germany . |
| 2941596 | 4/1981 | Germany . |
| 3113442 | 10/1982 | Germany . |
| 3811493 | 10/1989 | Germany . |
| 3923462 | 1/1991 | Germany . |
| 3941902 | 2/1991 | Germany . |
| 4134325 | 4/1993 | Germany . |
| 92-359946 | 12/1992 | Japan . |
| WO9403573 | 2/1994 | WIPO . |

OTHER PUBLICATIONS

H. Kopsch, "Kalandertechnik", Carl Hanser Verlag,(1978), pp. 133–136.

"Encyclopedia of PVC", Marcel Dekker (1976/19770, vol. II, pp. 644–710, esp. p. 651.

"Introduction of Alcamizer", Kyowa Chemical Int. Co. Ltd., p. 2–36, Isuriganecho, Higashi–Ku, Osaka (reference unavailable).

*Primary Examiner*—Paul R. Michl
*Attorney, Agent, or Firm*—John E. Drach; Aaron R. Ettelman; Martin G. Meder

[57] ABSTRACT

The invention concerns the use of a stabilizer combination for polyvinylchloride-based moulding compounds. The stabilizer combination contains (a) at least one solid inorganic component in amounts ranging from 0.3 to 3 parts by weight, relative to 100 parts by weight of polyvinylchloride, selected from sodium aluminosilicates, hydrotalcites and calcium-aluminium-hydroxy-phosphites, and (b) at least one solid or liquid zinc salt in amounts corresponding to a zinc to component (a) ratio of from 0.02 to 0.25 to 1, selected from zinc salts of monocarboxylic acids, substituted or unsubstituted benzoic acid and dicarboxylic acids. This stabilizer combination is used in the production of half-hard and soft polyvinylchloride foils by the calendering process in order to prevent a build-up of coating on the rollers used in this process.

21 Claims, No Drawings

USE OF A STABILIZER COMBINATION IN THE PRODUCTION OF FILMS OF POLYVINYL CHLORIDE BY THE CALENDERING PROCESS

FIELD OF THE INVENTION

This invention relates to the use of a stabilizer combination for molding compounds based on polyvinyl chloride (PVC) in the production of semirigid and flexible films of polyvinyl chloride by the calendering process for avoiding plate-out on the rolls used. In the context of the invention, the expression "molding compounds based on polyvinyl chloride" is understood to include both molding compounds based on conventional homopolymers or copolymers of vinyl chloride and those based on blends of polyvinyl chloride compounds with other polymers. The expression also encompasses suspension, bulk and emulsion polyvinyl chloride.

BACKGROUND OF THE INVENTION

Hitherto, liquid barium/cadmium stabilizers have normally been used in the thermoplastic processing of semirigid PVC and flexible PVC to form films by the calendering process. However, since toxic heavy metals, such as cadmium, are no longer acceptable today for reasons of factory hygiene and ecology, stabilizer systems based on liquid barium/zinc stabilizers have been increasingly used for the application mentioned. However, since the heavy metal, barium, also shows relatively high toxicity, there is a general trend in practice to replace these barium/zinc stabilizers also by physiologically safe calcium/zinc stabilizers.

In the calendering of flexible and semirigid PVC, the stabilizer system used has to meet stringent requirements. On the one hand, good early colors coupled with adequate color hold are required; on the other hand, the calendering process and the film properties often additionally required, such as good weathering resistance, not only have to guarantee excellent long-term stabilities, they are also expected to ensure problem-free regenerate processing. In addition, the stabilizer systems used should also reduce the tendency towards blocking and, hence, should enable the film to be removed more easily from the hot calender rolls and should have such rheological properties that the films are free from flow structures and do not have any defects. All these requirements have to be viewed in particular against the background of the high calendering speeds now typically encountered in practice. Another crucial requirement which stabilizers used for this purpose are expected to satisfy is the following: they should not cause any plate-out on calender rolls, take-off and cooling rolls or on any following embossing and laminating units.

The liquid Ba/Cd and Ba/Zn stabilizers normally used for the production of semirigid and flexible PVC films adequately satisfy the requirements discussed above. Although Ca/Zn stabilizers do not cause any plate-out on calender rolls, they often show only inadequate thermal stability and long-term stability. By contrast, hitherto known solid Ca/Zn stabilizers show the required long-term stability coupled with good early colors and color hold providing relatively large quantities of metal soaps are used. Unfortunately, stabilizers such as these cause such serious plate-out on calender rolls that they cannot be used in practice for the production of calendered films of flexible or semirigid PVC.

On the subject of known stabilizer systems containing calcium and/or zinc salts of fatty acids, reference is made for example to the following publications:

DE-A-31 13 442 relates to stabilized PVC molding compounds containing a stabilizer combination based on alkali metal, alkaline earth metal and/or zinc soaps, co-stabilizers, fine-particle crystalline water-containing alkali metal alumosilicates, lubricants and, optionally, other typical additives. Crucially, these stabilizer combinations—in addition to an alkali metal alumosilicate—must also contain a co-stabilizer selected from β-diketones, α-ketoenol esters, α-acyl lactones, substituted 1,4-dihydropyridine dicarboxylic acids and optionally substituted pyrroles. In one preferred embodiment, calcium soaps are used in conjunction with zinc soaps.

EP-A-0 027 588 describes stabilizer combinations for PVC molding compounds which contain the following components: fine-particle crystalline water-containing sodium alumosilicates, calcium salts of fatty acids, zinc salts of fatty acids, partial esters of fatty acids and polyols and thioglycolic acid esters of polyols and/or monohydric alcohols.

Finally, DE-A-41 34 325 relates to a process for stabilizing polymers based on chlorine-containing olefins using a stabilizer mixture containing the following components: calcium complexes of 1,3-diketones, zinc and optionally calcium salts, β-diketones, hydrotalcites, sodium alumosilicates and/or calcium/aluminium hydroxyphosphites and also polyols and/or hydroxyfunctional isocyanurates.

However, it has been found in practice that, where the stabilizer combinations disclosed in the prior art are used for the production of semirigid and flexible films of PVC by the calendering process, not all the requirements mentioned above are adequately satisfied. In particular, the formulations in question cause plate-out on calender rolls.

By contrast, the problem addressed by the present invention was to provide a stabilizer combination for the production of semirigid and flexible films of PVC which would meet the stringent thermal stability requirements of the calendering process (good initial color, color hold and long-term stability) and which, at the same time, would not cause any plate-out on the calender rolls or following machinery, such as take-off, laminating and embossing units.

SUMMARY OF THE INVENTION

Accordingly, the present invention relates to the use of a stabilizer combination for molding compounds based on polyvinyl chloride which contains a) at least one solid inorganic component in quantities of 0.3 to 3 parts by weight per 100 parts by weight of polyvinyl chloride selected from:

a1) synthetic, crystalline, fine-particle sodium alumosilicates containing 7 to 25% by weight of bound water and corresponding—in the water-free form—to formula (I):

$$0.7 \text{ to } 1.1 \, Na_2O.Al_2O_3.1.3 \text{ to } 5 \, SiO_2 \quad \text{(I)}$$

a2) optionally surface-modified hydrotalcites corresponding to formula (II):

$$Mg_{1-x}Al_x(OH)_2A_{x/n}^{n-}.mH_2O \quad \text{(II)}$$

in which $0<x<0.5$, m is a positive number and $A^{n-}$ is an anion with a valency of 1, 2 or 3, a3) basic calcium/aluminium hydroxyphosphites corresponding to formula (III):

$$Ca_zAl_2(OH)_{2(z+2)}HPO_3 \cdot pH_2O \qquad (III)$$

in which z is a number of 2 to 8 and p is a number of 0 to 12, b) at least one solid or liquid zinc salt selected from b1) zinc salts of saturated or unsaturated, linear or branched monocarboxylic acids containing 6 to 36 carbon atoms, b2) zinc salts of unsubstituted or $C_{1-4}$-alkyl-substituted benzoic acid, b3) zinc salts of saturated or unsaturated dicarboxylic acids containing 6 to 10 carbon atoms, in quantities corresponding to a ratio of zinc to component (a) of 0.02 to 0.25:1, in the production of semirigid and flexible films of polyvinyl chloride by the calendering process for avoiding plate-out on the rolls used.

DETAILED DESCRIPTION OF THE INVENTION

It has been found that, in the calendering of semirigid and flexible PVC films, the relatively large quantities of calcium soaps normally used in conventional Ca/Zn stabilizer systems are responsible for plate-out on calender and take-off rolls and on laminating units. Surprisingly, it has also been found that the calcium soaps in question can be replaced by the solid inorganic components (a) mentioned above without any deterioration in the required thermal stability values. Accordingly, the function of these calcium soaps as a long-term stabilizer is taken over by the solid inorganic components (a), the adverse effects otherwise observed in the form of plate-out on the rolls being completely suppressed.

As mentioned at the beginning, the present invention relates to molding compounds based on polyvinyl chloride (PVC), this expression encompassing conventional homopolymers or copolymers of vinyl chloride and also blends of such polyvinyl chloride compounds with other polymers. Corresponding polymers may have been produced in any way, for example by suspension, emulsion or block polymerization. They may have K values of, for example, about 65 to 80. The polyvinyl chloride used for the purposes of the invention preferably contains plasticizers in quantities of 10 to 100 parts by weight and, more particularly, in quantities of 30 to 60 parts by weight to 100 parts by weight of polyvinyl chloride. The so-called "semirigid" PVC films contain plasticizers in quantities of, for example, 10 to 25 parts by weight while the so-called "flexible" PVC films contain plasticizers in quantities of 25 to 100 parts by weight to 100 parts by weight of polyvinyl chloride. The plasticizers used may be any of the conventional types described in the prior art literature, cf. for example H. Kopsch, "Kalandertechnik", Carl Hanser Verlag (1978), pages 133 to 136.

As mentioned above, the solid inorganic component (a) of the stabilizer combination to be used in accordance with the invention may be selected from sodium alumosilicates, hydrotalcites and basic calcium/aluminium hydroxyphosphites. The following observations apply in this regard:

In their water-free form, the synthetic, crystalline fine-particle sodium alumosilicates containing 7 to 25% by weight of bound water mentioned under (a1) correspond to formula (I):

$$0.7 \text{ to } 1.1 \text{ Na}_2O \cdot Al_2O_3 \cdot 1.3 \text{ to } 5 \text{ SiO}_2 \qquad (I)$$

The synthetic crystalline sodium alumosilicates thus defined are zeolites known per se. The general formula encompasses both zeolites of type A and those of type P, i.e. zeolite types which differ only slightly in their chemical composition, but very considerably in regard to their structure and properties. Apart from their chemical composition, X-ray diffractograms are normally used to identify such zeolite types.

In their water-free form, zeolites of the A type may be characterized by the following formula:

$$0.7 \text{ to } 1.1 \text{ Na}_2O \cdot Al_2O_3 \cdot 1.3 \text{ to } 2.4 \text{ SiO}_2$$

The zeolites A to be used in accordance with the present invention contain 13 to 25% by weight of bound water. Zeolites A with a water content of 18 to 25% by weight are preferably used for the purposes of the present invention. In addition, zeolites A with a particle size of 0.1 to $20\mu$ are preferably used as component (a1). Corresponding zeolites A can be produced by known methods as described, for example, in DE-B-24 12 837. Reference is also made to the disclosures of the following documents: DE-A-41 34 325, EP-A-0 027 588, DE-A-29 41 596 and DE-A-31 13 442.

Zeolite P has many structurally different variants which differ above all in the symmetry of the crystal lattice. P zeolites of the $P_c$ type (cubic form) which—in their water-free form—may be characterized by the following formula:

$$0.7 \text{ to } 1.1 \text{ Na}_2O \cdot Al_2O_3 \cdot 1.8 \text{ to } 3 \text{ SiO}_2$$

are preferably used for the purposes of the present invention. They generally contain from 7 to 25% by weight of bound water. Information on the production of these zeolites can be found, for example, in the disclosures of DE-A-39 23 462 and WO 94/03573.

Component (a2) may be selected from optionally surface-modified hydrotalcites corresponding to formula (II):

$$Mg_{1-x}Al_x(OH)_2A_{x/n}{}^{n-} \cdot mH_2O \qquad (II)$$

in which 0<x<0.5, m is a positive number and $A^{n-}$ is an anion with a valency of 1, 2 or 3.

Hydrotalcites such as these are also known compounds which may be produced by various methods. Hydrotalcites suitable for use in accordance with the invention may be produced, for example, by the processes described in U.S. Pat. Nos. 3,539,306, 3,650,704, 3,875,525 and DE-C-15 92 126. Hydrotalcites corresponding to general formula (II), in which A stands for the carbonate anion, are preferred. Particularly preferred hydrotalcites are those with a specific BET surface of no more than 30 m²/g and especially those which are commercially available under the name of Alcamizer® from Kyowa Chemical Int. which have a specific BET surface of 8 m²/g (cf. the information pamphlet entitled "Introduction of Alcamizer", Kyowa Chemical Int. Co. Ltd., pages 2 to 36, Isuriganecho, Higashi-Ku, Osaka). More information on the hydrotalcites suitable for use in accordance with the invention can be found in the disclosures of the following documents: EP-B-0 063 180 and DE-A-41 34 325.

The basic calcium/aluminium hydroxyphosphites to be used as component (a3) in accordance with the invention correspond to formula (III):

$$Ca_zAl_2(OH)_{2(z+2)}HPO_3 \cdot pH_2O \qquad (III)$$

in which z is a number of 2 to 8 and p is a number of 0 to 12. These basic calcium/aluminium hydroxyphosphites are also known. Their production is described in DE-C-39 41 902. More information on this class of compounds can be found in the disclosure of DE-A41 34 325.

If desired, the hydrotalcites in particular and also the calcium/aluminium hydroxyphosphites may be surface-modified, for example with surface-active substances, such as sodium stearate. The production of such surface-modified compounds is best carried out in an aqueous suspension to ensure that the surface-active agent can be absorbed onto the surface of the solid powder.

According to the present invention, sodium alumosilicates of the zeolite A type and/or hydrotalcites are preferably used as component (a). In another preferred embodiment of the invention, components (a1) and/or (a2) are used individually or in the form of a mixture in quantities of 0.3 to 2 parts by weight per 100 parts by weight of polyvinyl chloride.

Solid or liquid zinc salts of
(b1) saturated or unsaturated, linear or branched monocarboxylic acids containing 6 to 36 carbon atoms or
(b2) unsubstituted benzoic acid or benzoic acid substituted by $C_{1-4}$ alkyl groups or
(b3) saturated or unsaturated dicarboxylic acids containing 6 to 10 carbon atoms are used as component (b) of the stabilizer combination to be used in accordance with the invention. According to the invention, these zinc salts may be used both individually and in the form of mixtures.

Corresponding zinc salts are known per se. They are generally produced by precipitation of zinc salts with the corresponding carboxylic acids mentioned above or directly from zinc oxide and these carboxylic acids. Examples of saturated, linear monocarboxylic acids which may be used in accordance with the invention include hexanoic acid (caproic acid), heptanoic acid (oenanthic acid), octanoic acid (caprylic acid), nonanoic acid (pelargonic acid), decanoic acid (capric acid), undecanoic acid, dodecanoic acid (lauric acid), tridecanoic acid, tetradecanoic acid (myristic acid), pentadecanoic acid, hexadecanoic acid (palmitic acid), heptadecanoic acid, octadecanoic acid (stearic acid), nonadecanoic acid, eicosanoic acid (arachic acid), heneicosanoic acid, docosanoic acid (behenic acid), tricosanoic acid, tetracosanoic acid (lignoceric acid), pentacosanoic acid, hexacosanoic acid (cerotic acid), octacosanoic acid, triacontanoic acid (melissic acid) and montanic acids. Similarly, the corresponding unsaturated and corresponding branched monocarboxylic acids may be considered for the zinc salts to be used in accordance with the invention. An example of the substituted benzoic acids mentioned is, in particular, p-tert.butyl benzoic acid. Basic zinc salts of the $(ZnO)_n Zn$ (monocarboxylic acid)$_2$ type, with n=0.5 to 2, may also be used in accordance with the invention. Basic zinc octoate is mentioned as an example of such a salt. These basic zinc salts may also be used either individually and in the form of mixtures with the zinc salts defined above. Adipic acid, pimelic acid, suberic acid, azelaic acid, and sebacic acid are mentioned as examples of saturated dicarboxylic acids although the corresponding unsaturated dicarboxylic acids may again be used.

In another preferred embodiment of the present invention, zinc salts of saturated, linear or branched monocarboxylic acids containing 8 to 18 carbon atoms may be used as component (b) in quantities corresponding to a ratio of zinc to component (a) of 0.02 to 0.2:1.

As mentioned above, the stabilizing effect of this stabilizer combination of components (a) and (b) is entirely adequate for the purposes of the invention in regard to the required thermal stability values. In addition, however, it can be of advantage in accordance with the invention additionally to incorporate lubricants or release agents (c) to improve the rheological properties of the stabilizer combination to be used in accordance with the invention.

In another preferred embodiment of the present invention, the additional lubricants or release agents (c) used are solid or liquid calcium salts and/or magnesium salts and/or aluminium salts selected from (c1) calcium salts of saturated or unsaturated, linear or branched monocarboxylic acids containing 6 to 36 carbon atoms in quantities of 0.05 to 0.3 part by weight,
(c2) calcium salts of unsubstituted or $C_{1-4}$-alkyl-substituted benzoic acid in quantities of 0.05 to 0.3 part by weight,
(c3) calcium salts of saturated or unsaturated dicarboxylic acids containing 6 to 10 carbon atoms in quantities of 0.05 to 0.3 part by weight,
(c4) magnesium salts of saturated or unsaturated, linear or branched monocarboxylic acids containing 6 to 36 carbon atoms in quantities of 0.05 to 0.4 part by weight,
(c5) magnesium salts of saturated or unsaturated dicarboxylic acids containing 6 to 10 carbon atoms in quantities of 0.05 to 0.4 part by weight,
(c6) aluminium salts of saturated or unsaturated, linear or branched monocarboxylic acids containing 6 to 36 carbon atoms in quantities of 0.05 to 0.4 part by weight, the parts by weight mentioned being based on 100 parts by weight of polyvinyl chloride.

It has surprisingly been found that the small quantities of salts mentioned above produce an improvement in the rheological properties without causing any plate-out on the rolls used in the calendering process. The calcium, magnesium and aluminium salts mentioned above may be used both individually and in the form of mixtures as additional lubricants or release agents. So far as the carboxylic acids to be used in each of components (c1) to (c6) mentioned above are concerned, reference is made to the foregoing observations in connection with the zinc salts to be used in accordance with the invention. The carboxylic acids mentioned here may likewise also be part of the calcium, magnesium and/or aluminium salts to be used in accordance with the invention as additional lubricants or release agents.

According to the invention, calcium salts of saturated linear monocarboxylic acids containing 16 to 22 carbon atoms in quantities of 0.1 to 0.2 part by weight per 100 parts by weight of polyvinyl chloride are used as component (c).

In addition, magnesium salts of saturated linear monocarboxylic acids containing 16 to 22 carbon atoms in quantities of 0.1 to 0.4 part by weight per 100 parts by weight of polyvinyl chloride are preferably used as component (c).

In another preferred embodiment of the present invention, the additional lubricants or release agents (c) are selected from the compounds known for this purpose from the prior art. According to the invention, compounds of the following types are preferably used as additional lubricants or release agents: homopolymers and/or copolymers of acrylate and/or methacrylate, oxidized polyethylene waxes, free fatty acids containing 8 to 22 carbon atoms and branched isomers thereof, for example stearic acid or even hydroxystearic acid, α-olefins, wax esters, i.e. esters of relatively long-chain monocarboxylic acids and monoalcohols, primary and secondary saturated and unsaturated higher alcohols preferably containing 16 to 44 carbon atoms in the molecule, ethylenediamine distearate, montanic acid esters of diols, for example ethanediol, 1,3-butane diol and glycerol, mixtures of such montanic acid esters with non-esterified montanic acids, partial esters of fatty acids containing 8 to 22 carbon atoms and polyols containing 2 to 6 carbon atoms and 2 to 6 hydroxyl groups which contain on average at least one free polyol hydroxyl group per molecule and other compounds as listed, for example, in L. I. Nass, "Encyclopedia of PVC", Marcel Dekker (1976/1977), Vol. II, pages 644 et seq., more particularly page 651. In addition, the mixed esters described in DE-C-19 07 768 with hydroxyl or acid values of 0 to 6 of aliphatic, cycloaliphatic or aromatic dicarboxylic acids containing 2 to 22 carbon atoms in the molecule, aliphatic polyols containing 2 to 6 hydroxyl groups in the molecule and aliphatic monocarboxylic acids containing 12 to 30 carbon atoms in the molecule may also be used with advantage. Examples of these mixed esters are mixed esters of maleic acid/pentaerythritol/behenic acid, mixed esters of adipic acid/pentaerythritol/oleic acid and mixed esters of adipic acid/pentaerythritol/stearic acid. According to the invention, lubricants or release agents such as these may be used both instead of and in conjunction with the above-mentioned metal salts of calcium, magnesium or aluminium as an additional lubricant or release agent component (c). Depending on the type of compound used, the quantity added is from 0.05 to 1.5 parts by weight per 100 parts by weight of polyvinyl chloride.

The stabilizer combination according to the invention may optionally contain additional co-stabilizers. Corresponding co-stabilizers are also known from the relevant prior art literature. According to the invention, the co-stabilizers to be additionally used are preferably selected from β-diketones, organic phosphites, polyols, epoxidized oils, esters of epoxidized fatty acids with monoalcohols, calcium complexes of 1,3-diketones, thioglycolic acid esters of polyols or monohydric alcohols and antioxidants. These co-stabilizers may also be used either individually and in the form of mixtures with one another. So far as their compositions are concerned, reference is made to the relevant prior art literature. More specifically, the following observations may be made in this regard:

β-diketones suitable for the purposes of the present invention are compounds known per se which are described, for example, in DE-B-27 28 865 or in DE-B-26 00 516 or in EP-B-0 063 180. Particularly preferred β-diketones are selected from benzoyl acetone, bis-(4-methylbenzoyl)-methane, stearoyl benzoyl methane, palmitoyl benzoyl methane, dibenzoyl methane, 4-methoxybenzoyl methane, benzoyl acetyl octyl methane, dibutanoyl methane, distearoyl methane, acetyl acetone and stearoyl acetone. Corresponding β-diketones are also disclosed in DE-A-41 34 325 and in DE-A-31 13 442.

Suitable organic phosphites are secondary and/or tertiary esters of phosphorous acid with hydroxyl compounds selected from alkanols containing 8 to 22 carbon atoms, phenol, $C_{6-12}$-alkyl-substituted phenols and polyols containing 2 to 6 hydroxyl groups and 2 to 32 carbon atoms. Corresponding organic phosphites are disclosed, for example, in DE-A-41 34 325 and in DE-A-38 11 493. According to the invention, commercially available solid phosphites may also be used as co-stabilizers.

According to the invention, suitable polyols are those containing 2 to 32 carbon atoms and 2 to 6 primary hydroxyl groups and/or hydroxyfunctional isocyanurates. According to the invention, the polyols are preferably selected from ditrimethylol propane, dipentaerythritol and hydroxyfunctional isocyanurates. Hydroxyfunctional isocyanurates are also known compounds which may be obtained by ring-opening trimerization of hydroxyfunctional isocyanates. Among these isocyanurates, tris-(2-hydroxyethyl)-isocyanurate is preferably used.

Epoxidized oils suitable for use in accordance with the present invention are epoxides of esters of unsaturated linear fatty acids, for example epoxidized soybean oil, linseed oil, sunflower oil or tall oil, and alkyl epoxystearates.

The calcium complexes of 1,3-diketones to be used in accordance with the invention are also known. Corresponding calcium complexes of 1,3-diketones are disclosed, for example, in DE-C-27 16 389 and DE-A-41 34 325. Calcium acetyl acetonate obtainable from 1 mole of calcium hydroxide and 2 moles of acetyl acetone is preferably used for the purposes of the invention.

Thioglycolic acid esters suitable for the purposes of the invention are those of polyols containing 2 to 6 carbon atoms and 2 to 6 hydroxyl groups and/or those of monohydric alcohols containing 8 to 22 carbon atoms. Corresponding thioglycolic acid esters are disclosed, for example, in EP-A-0 027 588.

Antioxidants suitable for the purposes of the invention are the compounds known from the prior art, for example 2,6-di-t-butyl-p-cresol, 2,5-di-t-butyl hydroquinone, octadecyl-3-(3,5-di-t-butyl-4-hydroxyphenyl)-propionate, diphenylol propane, 2,5-bis-(1,1-dimethylpropyl)-hydroquinone, 1,1,3-tris-(5-t-butyl-4-hydroxy-2-methylphenyl)-butane, and ultraviolet absorbers, such as 2-hydroxy4-octoxybenzophenone and ethyl-2-cyano-3,3-diphenyl acrylate.

The stabilizer combination according to the invention and the components, if any, additionally used, as defined in detail in the foregoing, are incorporated in the PVC compounds by mixing, for example using plowshare mixers, high-speed mixers, co-kneaders, pelletizers, mixing rolls, extruders or intensive mixers.

EXAMPLES

Description of the Test Procedures

The stability of the PVC molding compound was assessed from the static thermal stability of strips. To this end, PVC molding compounds containing stabilizer combination were processed on laboratory rolls to form strips. The strips size-reduced to test specimens were then exposed to a temperature of 190° C. in a drying cabinet with revolving trays (Heraeus 6060). Samples were taker at 15-minute intervals and inspected for changes in color, a black coloration indicating the end of stability.

Plate-out was evaluated as follows on computer-controlled measuring rolls (450 mm roll width×252 mm roll diameter): a strip was first formed on the front roll by introducing the mixture and was mixed by hand for 3 minutes. The surface temperatures of the rolls were 185° C. (front) and 175° C. (rear). After the mixture had been homogenized on the rolls, an automatic running program was started as follows: by changing the friction (40%), the strip was transferred from the front roll to the rear roll. Plate-out on the chromium-plated roll was then visually evaluated at a rotational speed of 10 r.p.m. and with a nip of 0.35 mm. The chromium-plated, mirror-finish rolls enable plate-out to be precisely evaluated. In another step, it was evaluated whether the strip was difficult or easy to remove from the roll.

Composition of the PVC Molding Compounds

100 Parts by weight of suspension PVC with a K value of 71 (Solvic® 271 GC) was mixed with the compounds listed in Table 1 in the quantities indicated (quantities in parts by weight per 100 parts by weight of PVC; phr). Examples 1 and 2 are Comparison Examples.

The terms and abbreviations used in Table 1 have the following meanings:

DiDP plasticizer: phthalic acid diisodecyl ester stabilized with 0.3% by weight of bisphenol A
ESO: epoxidized soybean oil
DPDP: diphenyl isodecyl phosphite
Multicomponent ester: ester mixture of alcohols containing 2 to 6 hydroxyl groups with aliphatic monocarboxylic acids containing 12 to 30 carbon atoms and aliphatic dicarboxylic acids containing 2 to 22 carbon atoms according to DE-C-19 07 768
BaZn stabilizer: commercial liquid BaZn stabilizer
Zeolite: type A zeolite containing 20% $H_2O$ according to EP-A-0 027 588
Hydrotalcite: commercial hydrotalcite
CHAP: calcium aluminium hydroxyphosphite Patent Examples 1. Reference BaZn stabilizer
2. Stabilizer system based on solid CaZn soaps
3. Zeolite/Zn soap (Zn octoate)
4. Hydrotalcite/Zn soap (Zn stearate)
5. CaAl hydroxyphosphite/Zn soap (Zn stearate)
6. Patent Example 1 plus rheology component stearic acid
7. Example 3 plus rheology component liquid multicomponent ester
8. Example 3 plus rheology component Ca stearate/stearic acid
9. Example 3 plus rheology component Mg stearate
10. Example 3 plus rheology component Al stearate $0.7–1.1\ Na_2O.Al_2O_3.1.3–5\ SiO_2$ (I)

(a2) hydrotalcites of the general formula (II):

$Mg_{1-x}Al_x(OH)_2A_{x/n}{}^{n-}.mH_2O$ (II)

wherein $0<x<0.5$, m is a positive number and $A^{n-}$ represents an anion having a valency of from 1 to 3;

(a3) basic calcium/aluminum hydroxyphosphites of the general formula (III):

$Ca_zAl_2(OH)_{2(z+2)}HPO_3.pH_2O$ (III)

wherein z represents a number of from 2 to 8 and p represents a number of from 0 to 12;

(b) at least one zinc salt in a weight ratio of zinc to component (a) of from about 0.02:1 to about 0.25:1, wherein the at least one zinc salt is selected from the group consisting of zinc salts of monocarboxylic acids having from about 6 to about 36 carbon atoms, zinc salts of dicarboxylic acids having from about 6 to about 10 carbon atoms, zinc salts of benzoic acid, and zinc salts of $C_{1-4}$-substituted benzoic acid; and

TABLE 1

| Example | 1 | 2 | 3 | 4 | 5 | 6 | 7 | 8 | 9 | 10 |
|---|---|---|---|---|---|---|---|---|---|---|
| S-PVC, K value 71 | 100 | 100 | 100 | 100 | 100 | 100 | 100 | 100 | 100 | 100 |
| DiDP plasticizer | 60 | 60 | 60 | 60 | 60 | 60 | 60 | 60 | 60 | 60 |
| ESO | 3 | 3 | 3 | 3 | 3 | 3 | 3 | 3 | 3 | 3 |
| Org. phosphite DPDP | — | 0.8 | 0.8 | 0.8 | 0.8 | 0.8 | 0.8 | 0.8 | 0.8 | 0.8 |
| Ca stearate | — | 0.8 | — | — | — | — | — | 0.1 | — | — |
| Mg stearate | — | — | — | — | — | — | — | — | 0.1 | — |
| Al stearate | — | — | — | — | — | — | — | — | — | 0.1 |
| Stearic acid | — | — | — | — | — | 0.2 | — | 0.2 | — | — |
| Liquid multicomponent ester | — | — | — | — | — | — | 0.2 | — | — | — |
| BaZn stabilizer | 2.5 | — | — | — | — | — | — | — | — | — |
| Zeolite | — | — | 1 | — | — | 1 | 1 | 1 | 1 | 1 |
| Hydrotalcite | — | — | — | 1 | — | — | — | — | — | — |
| CHAP | — | — | — | — | 1 | — | — | — | — | — |
| Zn octoate | — | — | 0.5 | — | — | 0.5 | 0.5 | 0.5 | 0.5 | 0.5 |
| Zn stearate | — | 0.25 | — | 0.25 | 0.25 | — | — | — | — | — |
| Stat. thermal stability at 190° C. in the drying cabinet: | | | | | | | | | | |
| Initial color | ← Colorless → | | | | | | | | | |
| Early color hold (mins.) | 60 | 45–60 | 60 | 45 | 60 | 60 | 60 | 60 | 60 | 60 |
| End of stability (mins.) | 105 | 90 | 105 | 90 | 90 | 105 | 105 | 105 | 105 | 105 |
| Plate-out on the measuring rolls: | | | | | | | | | | |
| Yes | | $x^1$ | | | | | | | | |
| No | $x^1$ | | $x^2$ | $x^2$ | $x^2$ | $x^1$ | $x^1$ | $x^1$ | $x^1$ | $x^1$ |

[1] Strip shows slight tendency to adhere to the roll on removal
[2] Strip shows greater tendency to adhere to the roll on removal

What is claimed is:

1. A process for stabilizing a polyvinyl chloride-containing composition used in the production of semi-rigid and flexible films, said process comprising:
   (i) providing a polyvinyl chloride-containing composition;
   (ii) providing a stabilizer composition comprising:
      (a) at least one inorganic component in an amount of from about 0.03 to about 3 parts by weight per 100 parts by weight of polyvinyl chloride, wherein the at least one inorganic component is selected from the group consisting of:
         (a1) synthetic, crystalline, fine-particle sodium aluminosilicates containing from about 7 to about 25% by weight of bound water, wherein the sodium aluminosilicates, in water-free form, correspond to the general formula (I):

(c) at least one component selected from (c1) calcium salts of saturated linear monocarboxylic acids having from 16 to 22 carbon atoms in an amount of 0.1 to 0.2 parts by weight per 100 parts by weight of polyvinyl chloride, and (c2) magnesium salts of saturated linear monocarboxylic acids having from 16 to 22 carbon atoms in an amount of 0.1 to 0.4 parts by weight per 100 parts by weight of polyvinyl chloride; and
   (iii) combining the polyvinyl chloride-containing composition and the stabilizer composition prior to using the polyvinyl chloride-containing composition in the production of semi-rigid and flexible films.

2. The process according to claim 1, wherein the polyvinyl chloride-containing composition further comprises a plasticizer in an amount of from 10 to 100 parts by weight per 100 parts by weight of polyvinyl chloride.

3. The process according to claim 1, wherein the polyvinyl chloride-containing composition further comprises a plasticizer in an amount of from 30 to 60 parts by weight per 100 parts by weight of polyvinyl chloride.

4. The process according to claim 1, wherein the at least one inorganic component is selected from the group consisting of zeolite A sodium aluminosilicates and hydrotalcites of the general formula (II), wherein the at least one inorganic component is present in an amount of from about 0.3 to about 2 parts by weight per 100 parts by weight of polyvinyl chloride.

5. The process according to claim 1, wherein the at least one zinc salt comprises a saturated monocarboxylic acid having from 8 to 18 carbon atoms, and wherein the at least one zinc salt is present in a weight ratio of zinc to component (a) of from about 0.02:1 to about 0.2:1.

6. The process according to claim 1, wherein the at least one inorganic component is selected from the group consisting of zeolite A sodium aluminosilicates of the general formula (IV):

$$0.7\text{--}1.1\ Na_2O.Al_2O_3.1.3\text{--}2.4\ SiO_2 \qquad (IV)$$

containing from about 18 to about 25% by weight of bound water and having a particle size of from 0.1 to 20 $\mu$m, and hydrotalcites of the general formula (II) wherein $A^{n-}$ represents a carbonate anion and the hydrotalcite has a specific BET surface value less than or equal to 30 m$^2$/g, wherein the at least one inorganic component is present in an amount of from about 0.3 to about 2 parts by weight per 100 parts by weight of polyvinyl chloride.

7. The process according to claim 6, wherein the at least one zinc salt comprises a saturated monocarboxylic acid having from 8 to 18 carbon atoms, and wherein the at least one zinc salt is present in a weight ratio of zinc to component (a) of from about 0.02:1 to about 0.2:1.

8. The process according to claim 1, wherein the at least one component (c) is selected from the group consisting of calcium stearate and magnesium stearate.

9. The process according to claim 6, wherein the at least one component (c) is selected from the group consisting of calcium stearate and magnesium stearate.

10. The process according to claim 7, wherein the at least one component (c) is selected from the group consisting of calcium stearate and magnesium stearate.

11. A stabilized polyvinyl chloride-containing compound produced by the process according to claim 1.

12. A stabilized polyvinyl chloride composition comprising:
  (i) a polyvinyl chloride-containing composition; and
  (ii) a stabilizer composition, wherein the stabilizer composition comprises:
    (a) at least one inorganic component in an amount of from about 0.03 to about 3 parts by weight per 100 parts by weight of polyvinyl chloride, wherein the at least one inorganic component is selected from the group consisting of:
      (a1) synthetic, crystalline, fine-particle sodium aluminosilicates containing from about 7 to about 25% by weight of bound water, wherein the sodium aluminosilicates, in water-free form, correspond to the general formula (I):

$$0.7\text{--}1.1\ Na_2O.Al_2O_3.1.3\text{--}5\ SiO_2 \qquad (I)$$

(a2) hydrotalcites of the general formula (II):

$$Mg_{1-x}Al_x(OH)_2A_{x/n}{}^{n-}.mH_2O \qquad (II)$$

wherein 0<x<0.5, m is a positive number and $A^{n-}$ represents an anion having a valency of from 1 to 3;
    (a3) basic calcium/aluminum hydroxyphosphites of the general formula (III):

$$Ca_zAl_2(OH)_{2(z+2)}HPO_3.pH_2O \qquad (III)$$

wherein z represents a number of from 2 to 8 and p represents a number of from 0 to 12;
  (b) at least one zinc salt in a weight ratio of zinc to component (a) of from about 0.02:1 to about 0.25:1, wherein the at least one zinc salt is selected from the group consisting of zinc salts of monocarboxylic acids having from about 6 to about 36 carbon atoms, zinc salts of dicarboxylic acids having from about 6 to about 10 carbon atoms, zinc salts of benzoic acid, and zinc salts of $C_{1\text{-}4}$-substituted benzoic acid; and
  (c) at least one component selected from (c1) calcium salts of saturated linear monocarboxylic acids having from 16 to 22 carbon atoms in an amount of 0.1 to 0.2 parts by weight per 100 parts by weight of polyvinyl chloride, and (c2) magnesium salts of saturated linear monocarboxylic acids having from 16 to 22 carbon atoms in an amount of 0.1 to 0.4 parts by weight per 100 parts by weight of polyvinyl chloride.

13. The composition according to claim 12, wherein the polyvinyl chloride-containing composition further comprises a plasticizer in an amount of from 10 to 100 parts by weight per 100 parts by weight of polyvinyl chloride.

14. The composition according to claim 12, wherein the polyvinyl chloride-containing composition further comprises a plasticizer in an amount of from 30 to 60 parts by weight per 100 parts by weight of polyvinyl chloride.

15. The composition according to claim 12, wherein the at least one inorganic component is selected from the group consisting of zeolite A sodium aluminosilicates and hydrotalcites of the general formula (II), wherein the at least one inorganic component is present in an amount of from about 0.3 to about 2 parts by weight per 100 parts by weight of polyvinyl chloride.

16. The composition according to claim 12, wherein the at least one zinc salt comprises a saturated monocarboxylic acid having from 8 to 18 carbon atoms, and wherein the at least one zinc salt is present in a weight ratio of zinc to component (a) of from about 0.02:1 to about 0.2:1.

17. The composition according to claim 12, wherein the at least one inorganic component is selected from the group consisting of zeolite A sodium aluminosilicates of the general formula (IV):

$$0.7\text{--}1.1\ Na_2O.Al_2O_3.1.3\text{--}2.4\ SiO_2 \qquad (IV)$$

containing from about 18 to about 25% by weight of bound water and having a particle size of from 0.1 to 20 $\mu$m, and hydrotalcites of the general formula (II) wherein $A^{n-}$ represents a carbonate anion and the hydrotalcite has a specific BET surface value less than or equal to 30 m$^2$/g, wherein the at least one inorganic component is present in an amount of from about 0.3 to about 2 parts by weight per 100 parts by weight of polyvinyl chloride.

18. The composition according to claim 17, wherein the at least one zinc salt comprises a saturated monocarboxylic acid having from 8 to 18 carbon atoms, and wherein the at least one zinc salt is present in a weight ratio of zinc to component (a) of from about 0.02:1 to about 0.2:1.

19. The composition according to claim 12, wherein the at least one component (c) is selected from the group consisting of calcium stearate and magnesium stearate.

20. The composition according to claim 17, wherein the at least one component (c) is selected from the group consisting of calcium stearate and magnesium stearate.

21. The composition according to claim 18, wherein the at least one component (c) is selected from the group consisting of calcium stearate and magnesium stearate.

* * * * *